March 8, 1932. A. H. FLECK 1,848,521
FITTING
Filed Jan. 19, 1931 2 Sheets-Sheet 1
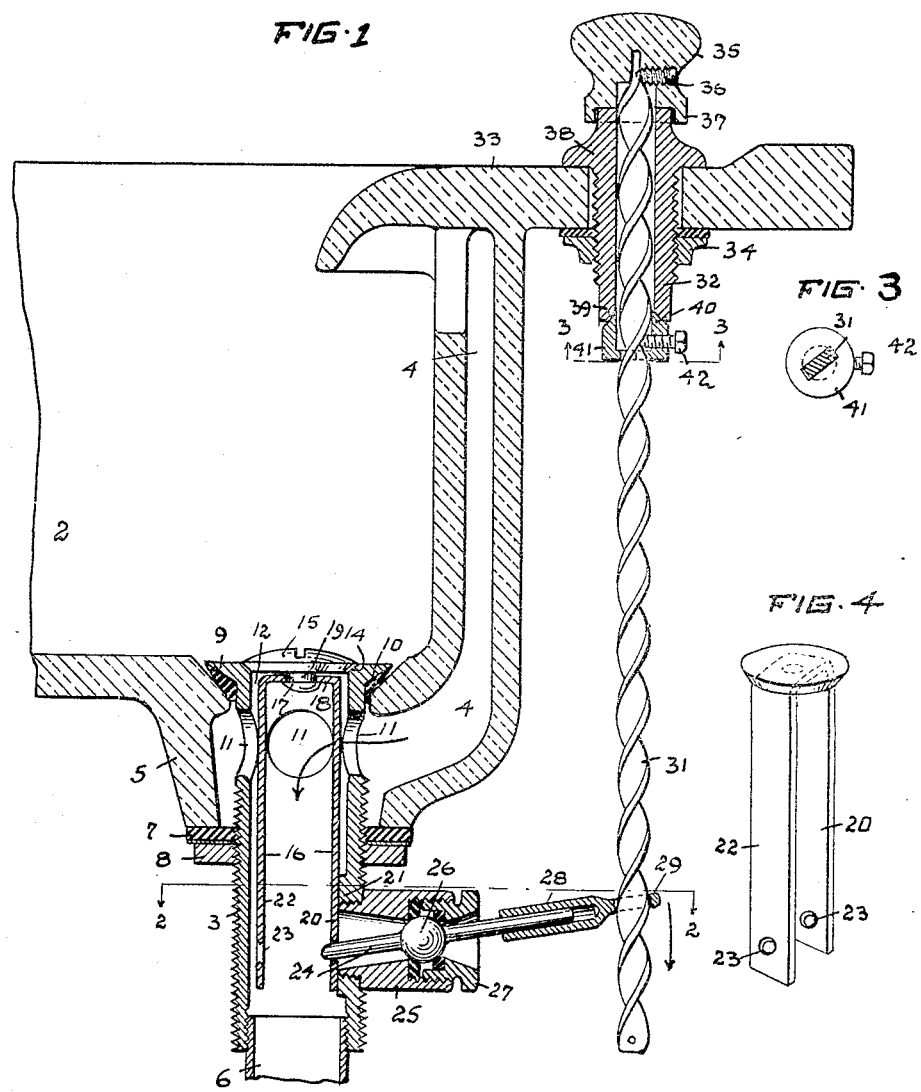
INVENTOR
ALBERT H. FLECK
BY
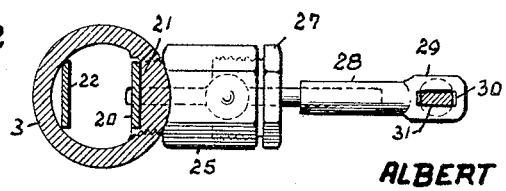
ATTORNEYS

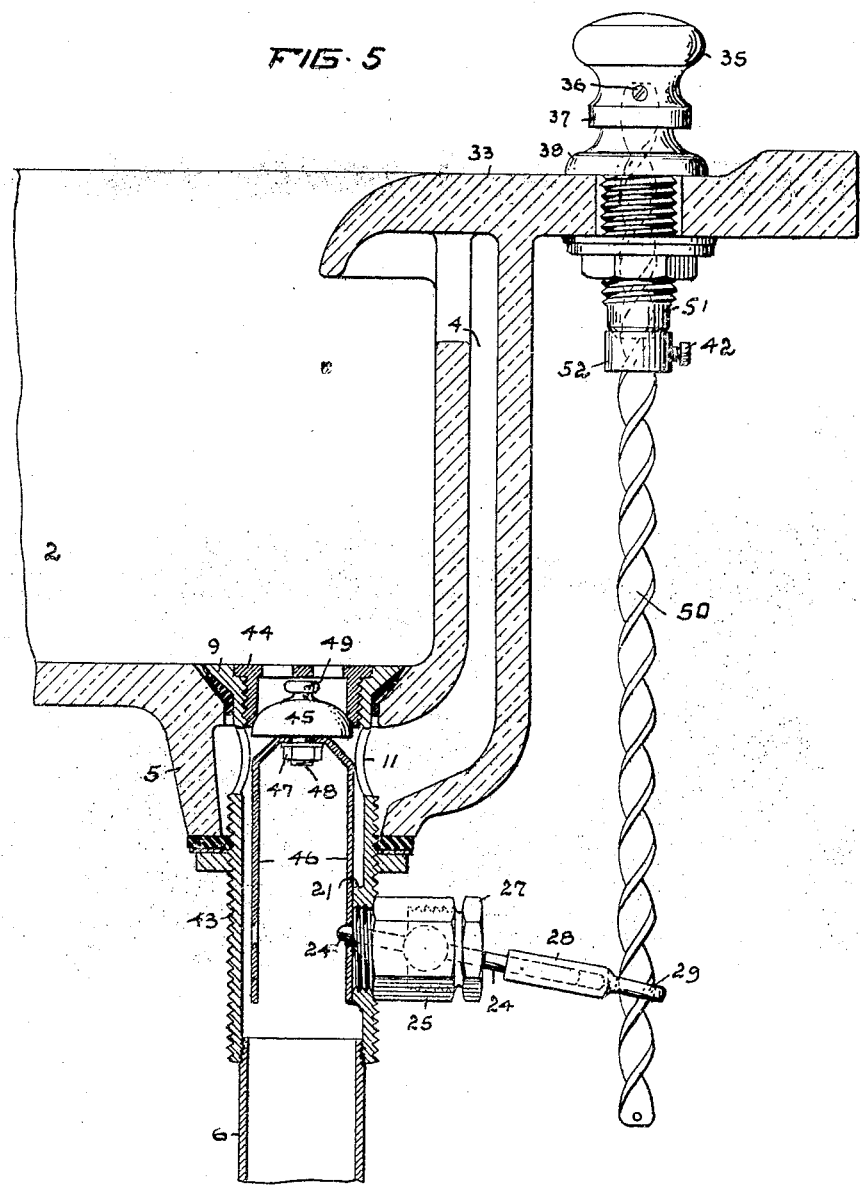

Patented Mar. 8, 1932

1,848,521

UNITED STATES PATENT OFFICE

ALBERT H. FLECK, OF CLEVELAND, OHIO, ASSIGNOR OF TWO-FIFTHS TO MICHAEL B. KOELLIKER, OF CLEVELAND, OHIO

FITTING

Application filed January 19, 1931. Serial No. 509,561.

My invention relates to bath, basin and receptable fittings, especially outlet valves and operators therefor, all as hereinafter shown and described in greater detail and as more concisely set forth in the claims. One object of my improvement is to provide a simple and durable outlet valve fitting and operating device which may be easily installed and adjustably fitted to a basin or tub with a minimum amount of labor and expense. A further object is to provide valved means which may be easily operated but not easily put out of order by repeated usage. Another object is to provide a valve and fitting which will permit the free escape of water when the valve is opened and which will not collect foreign matter readily and become easily closed and obstructed. These and other objects are embodied in the specific construction shown in the accompanying drawings, in which Fig. 1 is a sectional view of a portion of a lavatory bowl or basin embodying my invention, and Fig. 2 a sectional view of the lower part of the waste fitting and spiral operating member on line 2—2 of Fig. 1. Fig. 3 is a cross section in plan of the adjusting and tightening nut on line 3—3 of Fig. 1, and Fig. 4 a perspective view of the outlet valve itself. Fig. 5 is a view corresponding to Fig. 1, but showing a modified form of the invention.

The receptacle shown in the drawings represents a portion of a lavatory basin 2 having a tubular outlet fitting 3 in its bottom and an overflow passage 4 in one side wall which opens into a chambered boss 5 through which fitting 3 extends. A discharge pipe 6 is connected to the lower end of tubular fitting 3, and a sealing washer 7 and screw nut 8 fasten the fitting tightly within boss 5. Fitting 3 has a flanged upper end 9 seated upon a sealing gasket 10 within the bottom of the basin, and the sides of the fitting contain openings 11 through which the overflow water may pass freely into the fitting from passage 4. The upper end 9 of the fitting contains a circular drain opening 12 bordered by a flaring valve seat 14, and a beveled disc-shaped valve 15 closes said drain opening tightly when lowered upon said seat. To permit the valve to find its seat readily it may be loosely connected to a guiding and supporting member 16 confined within the tubular fitting and free to slide vertically within limits therein. As shown in Fig. 4, member 16 is made of a flat strip of metal bent into a U or yoke-shape and provided with a central opening 17 in its cross part 18 to receive a headed stud 19 depending from the bottom of valve 15. In some cases valve 15 must be ground to its seat, and the valve is therefore preferably connected in rotatable union with yoke member 16 to permit grinding operations. On the other hand it is not desirable to have the yoke member rotate within the tubular fitting, so one of the flat guiding legs 20 of this member extends downwardly in sliding engagement with a flat-sided boss 21 internally of the fitting to prevent rotation of the member. The opposite leg 22 of guiding member 16 engages the circular wall of the fitting, and one or both of the depending legs have openings 23 near their lower extremities to admit one end of an oscillatory rod or shaft 24 which is supported within a lateral branch 25 of the fitting. Branch part 25 may be made separable or integral with the body of the fitting, and the oscillatory shaft may have a spherical enlargement 26 between its opposite ends to permit this element to be socketed and held in place by a nut 27 and to oscillate in a vertical plane whereby the yoke may be reciprocated and the valve raised and lowered in respect to its seat. The outer end of oscillatory shaft 24 may be of any desirable length and it protrudes through nut 27 and carries a sleeve or tubular extension 28 having a flattened extremity 29 containing a straight slot 30 through which a twisted bar or spiral strip of metal 31 extends. This spirally twisted element is rotatably supported in a tubular bushing or sleeve 32 seated upon the top or rim 33 of the basin and fastened thereto by a nut 34. A knob or handle 35 of any desired shape or form surmounts the spiral operating member 31 and may be affixed thereto by a set screw 36, and a depending flange 37 on this knob or handle covers the joint at the top of the enlarged escutcheon portion 38 of the supporting tube or sleeve 32 to prevent the entrance of water between the parts. The lower end of supporting tube 32 has a flaring entrance or seat 39 at its lower end to receive the conical end 40 of a collar 41 affixed to the spiral bar 31, and the opening in this collar corresponds in part to the cross-sectional shape of the bar so that the collar will be rotated when it is slipped longitudinally along the bar into engaging position with the flaring end seat 39. A set screw 42 serves to fasten this collar in rotatable bearing engagement with seat 39 so that the spiral bar will not bind or tilt when engaged and rotated by hand engagement at the knob or handle. Preferably, bar 31 is twisted uniformly throughout its length to give rigidity thereto, to permit convenient adjustment of locking collar 41, and to permit an operating connection to be made with the slotted end of the tubular extension or sleeve 28 of oscillatory shaft 24 even though the height of the basin or the distance between the operating shaft and the top of the basin should vary materially as is generally the case owing to the many different types of basins in use. Different spiral shapes may be given to the operating bar 31, that is, the pitch or slant of the spirally twisted portions thereof may be increased or decreased, but preferably a relatively steep pitch or slant is desired to oscillate shaft 24 sweepingly in an arc of substantial length and easily without bind by merely rotating the knob or handle 35 partially, say one-quarter or half of a turn thereof. For example, a bar or shaft twisted spirally or provided with spirals approximately one to two inches in length—three-eighths to one-half inch in diameter will oscillate shaft 24 in substantial degree with little effort and power.

In Fig. 5, I show a fitting constructed according to the invention but modified to effect closure of the drain opening upon an upward movement of the valve. In this case the upper end of tubular body 43 is provided with a removable drain plug 44 having a valve seat at its bottom, and valve 45 is wholly confined within the fitting and adapted to be raised and lowered therein by a yoke member 46 affixed by a nut 47 to a screw-threaded lug or stem 48 depending from the bottom of the valve. This valve may be grasped and lifted by a knob or projection 49 extending upwardly from the center of the spherically-shaped valve should its removal from the fitting be found necessary. The spiral operating shaft 50 in this figure is also locked within its supporting member 51 by a collar 52, but in this case the end of member 51 is beveled externally and the collar provided with a flaring seat, a reversal of the formation shown in Fig. 1.

What I claim, is:

1. In bath, basin and receptacle fittings, an outlet tube and valve, an oscillatory lever operatively connected with said valve, a rotatable shaft twisted spirally, and a slidable extension for said lever having an opening therein, of substantially the same shape as the cross sectional form of said shaft and through which opening the shaft extends loosely.

2. In bath, basin and receptacle fittings, a tubular outlet member, a U-shaped guide having a valve member loosely connected therewith to permit rotation of said valve in respect to said guide, an oscillatory lever connected to said yoke, and rotatable means for operating said lever.

3. In bath, basin and receptacle fittings, an outlet tube and valve; means for operating said valve, including a rotatable shaft; a tubular support for said shaft; and a beveled locking collar fixed to said shaft and rotatably engaging said support.

4. In bath, basin and receptacle fittings, an outlet member and valve; means for opening and closing said valve, including a rotatable controlling shaft having a spirally-twisted body, a tubular support for said shaft, and a locking collar fixed to said shaft in rotatable bearing engagement with said support.

In testimony whereof I affix my signature.

ALBERT H. FLECK.